(12) United States Patent
Koceski et al.

(10) Patent No.: US 9,971,952 B2
(45) Date of Patent: May 15, 2018

(54) SYSTEM AND METHOD FOR THREE-DIMENSIONAL NERVE SEGMENTATION USING CURVED MULTIPLANAR REFORMATTING MAGNETIC RESONANCE IMAGING

(71) Applicant: 3D IMAGING PARTNERS, Toronto (CA)

(72) Inventors: Saso Koceski, Skopje (MK); Filip Shteriev, Skopje (MK); Domenico Ciambrone, L'Aquila (IT); Lionel Lenkinski, Toronto (CA); Robert Lenkinski, Dallas, TX (US)

(73) Assignee: 3D Imaging Partners, Toronto, Ontario ( * ) Notice: Subject to any disclaimer, the term of this patent is extended or adjusted under 35 U.S.C. 154(b) by 0 days. days.

(21) Appl. No.: 15/019,417

(22) Filed: Feb. 9, 2016

(65) Prior Publication Data

US 2016/0232664 A1    Aug. 11, 2016

Related U.S. Application Data

(60) Provisional application No. 62/114,253, filed on Feb. 10, 2015.

(51) Int. Cl.
| | |
|---|---|
| *G06K 9/46* | (2006.01) |
| *G06T 7/00* | (2017.01) |
| *G06T 19/00* | (2011.01) |
| *G06T 7/12* | (2017.01) |
| *G06T 15/08* | (2011.01) |
| *G06K 9/00* | (2006.01) |

(52) U.S. Cl.
CPC ......... *G06K 9/4604* (2013.01); *G06K 9/0014* (2013.01); *G06T 7/12* (2017.01); *G06T 15/08* (2013.01); *G06T 19/00* (2013.01); *G06T 2207/10088* (2013.01); *G06T 2207/30101* (2013.01); *G06T 2207/30172* (2013.01); *G06T 2215/06* (2013.01); *G06T 2219/008* (2013.01)

(58) Field of Classification Search
CPC .......... G06T 7/0012; G06T 7/12; G06T 7/62; G06T 15/08; G06T 19/00; G06T 2207/10088; G06T 2207/20112; G06T 2207/30004; G06T 2219/008; G06K 9/4604; G06K 9/4638; G06K 9/50; G01R 33/5608; A61B 5/0033; A61B 5/004

See application file for complete search history.

(56) References Cited

U.S. PATENT DOCUMENTS

2014/0328529 A1* 11/2014 Koceski et al. ...... G06T 7/0097
382/131

* cited by examiner

*Primary Examiner* — Andrew W Johns
(74) *Attorney, Agent, or Firm* — Quarles & Brady LLP (57) ABSTRACT

Systems and methods for segmenting a nerve in a three-dimensional image volume obtained with a magnetic resonance imaging ("MRI") system are provided. A three-dimensional image volume that depicts a nerve and surrounding anatomical structures is provided and from that image volume the nerve is segmented. In general, a curved multiplanar reformatting ("CMPR") process is utilized to mark, segment, and then display the nerve in three dimensions.

8 Claims, 7 Drawing Sheets
(3 of 7 Drawing Sheet(s) Filed in Color)

SYSTEM AND METHOD FOR THREE-DIMENSIONAL NERVE SEGMENTATION USING CURVED MULTIPLANAR REFORMATTING MAGNETIC RESONANCE IMAGING

CROSS-REFERENCE TO RELATED APPLICATIONS

This application claims the benefit of U.S. Provisional Patent Application Ser. No. 62/114,253, filed on Feb. 10, 2015, and entitled "SYSTEM AND METHOD FOR THREE-DIMENSIONAL NERVE SEGMENTATION USING CURVED MULTIPLANAR REFORMATTING MAGNETIC RESONANCE IMAGING."

BACKGROUND OF THE INVENTION

The field of the invention is systems and methods for the segmentation of anatomy in medical images. More particularly, the invention relates to systems and methods for nerve segmentation in images acquired with magnetic resonance imaging ("MRI").

Nerve segmentation is an attractive clinical goal because allowing clinicians to accurately and non-invasively visualize the three-dimensional structure of a nerve can improve surgical planning and guidance, as well as improve treatment and diagnosis of pathologies associated with a nerve.

Region-growing techniques have been used to segment blood vessels; however, these methods are not adequate for segmenting anatomical structures, such as nerves, that may have low contrast in relation to the surrounding anatomical features.

Active contouring techniques can overcome some of the difficulties with region-growing, and have been implemented for segmenting blood vessels; however, these methods must be properly initialized and still suffer from lower reliability in low contrast areas of an image.

More recently, a nerve segmentation technique was described in co-pending U.S. Patent Application No. 2014/0328529. While this technique overcomes the limitations of previous segmentation methods, the technique may have some difficulty segmenting highly curved nerves, such as nerves that may be present in the brachial plexus.

It would therefore be desirable to provide a method for segmenting a three-dimensional volume associated with a nerve that is fast and robust to the unique image contrasts associated with nerve images.

SUMMARY OF THE INVENTION

The present invention overcomes the aforementioned drawbacks by providing a method for segmenting a nerve in a three-dimensional image volume obtained with a magnetic resonance imaging (MRI) system. The method includes providing a three-dimensional image volume that depicts a nerve and surrounding anatomical structures in a series of contiguous image slices obtained with an MRI system. A cross-sectional image is selected from the image volume, and a plurality of planes that intersect at a common point in the selected cross-sectional image are generated. These planes are generated so as to be orthogonal to the selected cross-sectional image. A planar reformatted image is then generated for each of the plurality of planes, and nerve contours are estimated in each of the planar reformatted images. User feedback is received to adjust the estimated nerve contours, and a surface estimate of the nerve is generated based on the adjusted nerve contours. A volume that defines the nerve is then segmented from the surrounding anatomical structures based on the generated surface estimate.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Described here are systems and methods for segmenting a nerve from a three-dimensional image volume obtained with a magnetic resonance imaging ("MRI") system. The nerve volume created with the method of the present invention can thus be displayed visually in three-dimensions, thereby allowing viewing of the nerve, in isolation or selectively overlaid with the surrounding anatomy, from any angle. The nerve volume can also be compared to series of image volumes acquired at differing time points to establish four-dimensional capabilities.

The systems and methods described here are particularly suited for segmenting highly curved or branching nerves with variations in diameter from a three-dimensional imaging volume obtained with MRI. In general, a curved multiplanar reformatting ("CMPR") process is utilized to visualize the nerve (its interior, border and surrounding tissues) at its entire length in a curved plane image.

As will be described in more detail below, this process generally starts by marking the nerve's central axis with a control point in some of the cross-sectional views. Then, further control points are marked approximately in the geometric center of the nerve at varying intervals through the course of the nerve. Nerve's central axis is geometrically interpolated by fitting natural cubic splines between the 3D control points.

By way of example, the nerve axis can be estimated by computing a three-dimensional Hermit, or natural, cubic spline between each pair of control points. A cubic spline is a spline constructed of piecewise third-order polynomials that pass through a set of M 3D control points. In this case each spline segment will be described by three cubic polynomials, one for each coordinate:

$$X(u) = a_x u^3 + b_x u^2 + c_x u + d_x$$
$$Y(u) = a_y u^3 + b_y u^2 + c_y u + d_y \quad (1);$$
$$Z(u) = a_z u^3 + b_z u^2 + c_z u + d_z$$

where u is parameter and $u \in [0,1]$.

The second derivative of each polynomial is commonly set to zero at the endpoints to provide a boundary condition that completes a system of M−2 equations for each coordinate. This produces a so-called "natural" cubic spline and leads to a simple tridiagonal system that can be readily solved to give the coefficients of the polynomials. The formation of the nerve axis using this cubic spline approach is generally carried out as follows.

Let the $i^{th}$ piece of the spline, along the Y coordinate, be represented by, $$Y_i(t) = a_i + b_i t + c_i t^2 + d_i t^3 \quad (2);$$

where t is a parameter where $t \in [0,1]$ and $i = 0, \ldots, n-1$. Then, $$Y_i(0) = y_i = a_i \quad (3);$$

$$Y_i(1) = y_{i+1} = a_i + b_i + c_i + d_i \quad (4).$$

Taking the derivative of $y_i(t)$ with respect to the parameter, t, in each interval then gives, $$Y'_i(0) = D_i = b_i \quad (5);$$

$$Y'_i(1) = D_{i+1} = b_i + 2c_i + 3d_i \quad (6).$$

Solving Eqns. (3)-(6) for the parameters $a_i$, $b_i$, $c_i$, and $d_i$ gives the following solutions:

$$a_i = y_i \quad (7);$$

$$b_i = D_i \quad (8);$$

$$c_i = 3(y_{i+1} - y_i) - 2D_i - D_{i+1} \quad (9);$$

$$d_i = (y_i - y_{i+1}) + D_i + D_{i+1} \quad (10).$$

Requiring that the second derivatives of Eqn. (2) also match at the points results in, $$Y_{i-1}(1) = y_i \quad (11);$$

$$Y'_{i-1}(1) = Y'_i(0) \quad (12);$$

$$Y''_{i-1}(1) = Y''_i(0) \quad (13);$$

$$Y_i(0) = y_i \quad (14);$$

for interior points, and $$Y_0(0) = y_0 \quad (15);$$

$$Y_{n-1}(1) = y_n \quad (16);$$

for endpoints. This gives a total of 4(n−1)+2=4n−2 equations for the 4n unknowns. As noted above, to obtain two or more conditions, the second derivatives of Eqn. (2) at the endpoints can be set to zero, $$Y''_0(0) = 0 \quad (17);$$

$$Y''_{n-1}(1) = 0 \quad (18).$$

Rearranging these equations results in the following symmetric tridiagonal system of equations:

$$\begin{bmatrix} 2 & 1 & & & & & \\ 1 & 4 & 1 & & & & \\ & 1 & 4 & 1 & & & \\ & & 1 & 4 & 1 & & \\ \vdots & & & \ddots & \ddots & \ddots & \\ & & & & 1 & 4 & 1 \\ & & & & & 1 & 2 \end{bmatrix} \begin{bmatrix} D_0 \\ D_1 \\ D_2 \\ D_3 \\ \vdots \\ D_{n-1} \\ D_n \end{bmatrix} = \begin{bmatrix} 3(y_1 - y_0) \\ 3(y_2 - y_0) \\ 3(y_3 - y_1) \\ \vdots \\ 3(y_{n-1} - y_{n-3}) \\ 3(y_n - y_{n-2}) \\ 3(y_n - y_{n-1}) \end{bmatrix}. \quad (19)$$

Figures 1, 2:
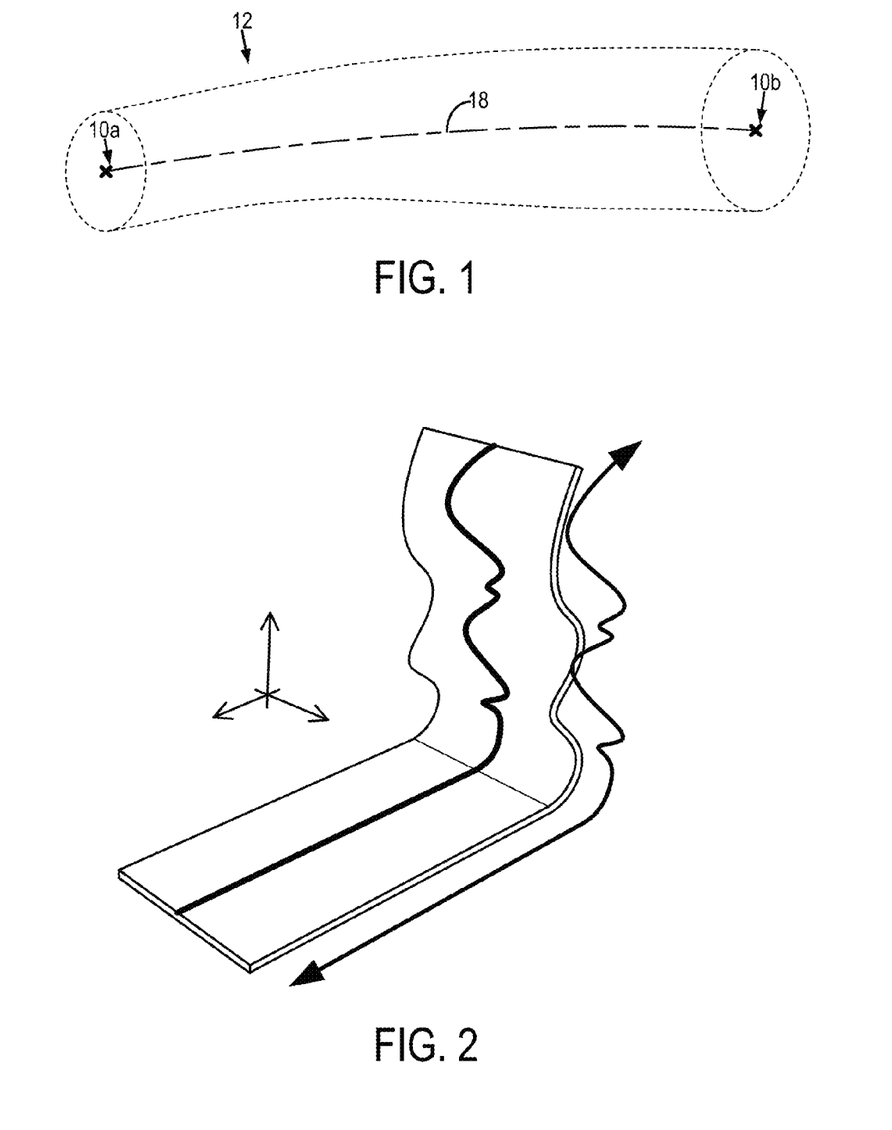
FIG. 1 is a pictorial representation of a nerve axis estimated between two control points.
FIG. 2 is a pictorial representation of a curved nerve being reformatted to a linear representation using a curved planar reformatting.

The system of equations in Eqn. (19) can thus be solved for each coordinate, to produce an estimate of the nerve axis. FIG. 1 illustrates an example of a nerve axis 18 that is estimated for a nerve 12. In this example, two control points 10a, 10b were selected and the nerve axis 18 was computed between those two points as described above.

Without loss of generality, and referring now to FIG. 2, the central axis 18 of the nerve 12 can be assumed to be a sequence of points $P_i$ at sub voxel resolution. The width of a straightened curved planar reformatting image of the nerve corresponds to the length of the central axis and generates a linear representation of the nerve 12. As illustrated in FIG. 2, the process of generating a curved planar reformatting image of the nerve results in straightening out the curved form of the nerve into a simple, linear representation (as seen on the left side of the figure).

In general, a curved planar reformatting image can be generated as follows. At each point $P_i$ of the nerve's central axis 18, a tangent vector $t_i$ is calculated. The plane $\epsilon_i$, which is a cross-section that is perpendicular to the actual anatomic course of the nerve, is defined by $P_i$ and $t_i$. A local coordinate system is defined by two generating vectors of the plane $\epsilon_i$:

$\vec{u}_i$ and $\vec{v}_i$, whereby $\vec{u}_i \perp \vec{v}_i$. A line-of-interest is then defined within the plane $\epsilon_i$ by an angle, $\varphi$, within the unit circle. This angle can be referred to as the "angle of interest."

Considering that one of the vectors $\vec{u}$ or $\vec{v}$ is mapped to the local coordinate system's x-axis, excessive rotation along the central axis which may cause undesired artifacts, are possible. As one way to minimize these distortions, a rational rotation-minimizing frames on space curves technique can be used. One example of this technique is described by W. Wang, et al., in "Computation of Rotation Minimizing Frame," *ACM Trans. Graph.*, 2008; 27(1), Article No. 2.

The direction of the line-of-interest $\vec{T}_i$ is given by formula $$\vec{T}_i = \cos \varphi \cdot \vec{u}_i + \sin \varphi \cdot \vec{v}_i \qquad (20).$$

The image offset $\Delta_i$ for the line-of-interest corresponding to point $P_{i+1}$ equals the distance from point $P_i$ to $P_{i+1}$:

$$\Delta_i = |\overrightarrow{P_i P_{i+1}}| \qquad (21).$$

For four different values of the angle $\varphi$ (e.g., 0°, 45°, 90°, 135°) four different straightened CMPR images are generated.

At these images the outline of the nerve is displayed as contours, or segmentation splines, which may include two lines with control points.

These contours are initially automatically generated using the algorithm described herein. Namely, first for each pixel with coordinates (x,y) on the straightened CMPR images the gray-level variance is calculated from it's 3×3 neighborhood, according to the formula bellow $$\sigma^2(x, y) = \frac{1}{9} \sum_{i=-1}^{1} \sum_{j=-1}^{1} (I_t(x+i, y+j) - \bar{I}_t(x, y))^2; \qquad (22)$$

where $\bar{I}_t$ is the mean of gray level values in the 3×3 neighborhood. Because the range of gray-level variance is significantly larger than that of the gradient, the variance, $\sigma^2(x,y)$, is first down-scaled so that both the values of the variance and the gradient are on similar scales.

The normalized variance can be computed as follows, $$\sigma_N^2(x, y) = 1 + \frac{\sigma^2(x, y) - \min\sigma^2}{\max\sigma^2 + \min\sigma^2}; \qquad (23)$$

where $\min \sigma^2$ and $\max \sigma^2$ are the minimum and maximum gray-level variance values of the image, respectively.

A sharp coefficient function preferably is a non-negative, monotonically increasing function, which will result in high coefficient values at edges that have relatively high gradient magnitudes. As a result, the edges can be distinctly enhanced. As an example, the weight of such a sharpening coefficient can be given as $\alpha$ with $0 \leq \alpha \leq 1$. This weighting factor determines the degree of sharpening with respect to the diffusion coefficient, $$\omega(\nabla I) = \alpha(1 - \gamma(\nabla I)) \qquad (24);$$

where $\gamma$ is a diffusion coefficient, which can be computed as follows, $$\gamma(\nabla I_t(x, y), \sigma_N^2(x, y)) = \frac{1}{1 + \left(\frac{\nabla I_t(x, y) \cdot \sigma^2(x, y)}{K_0}\right)^2}; \qquad (25)$$

where $K_0$ is a positive constant used as an edge strength threshold.

Figure 3:
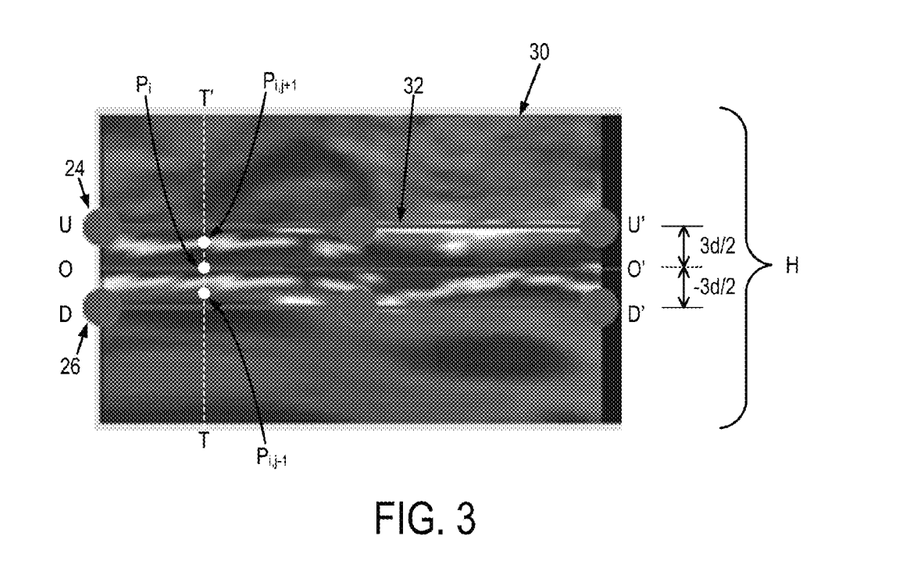
FIG. 3 is an example display depicting a planar reformatted image and associated points on that image that can be used to estimate the upper and lower boundaries of the nerve depicted in the image.

Referring to FIG. 3, an example of a curved planar reformatted image of a nerve is illustrated. At each pixel, $P_i$, with $0 \leq i \leq W$, along the nerve's central axis O-O', a perpendicular vertical line T-T' is generated. The diffusion and sharp coefficients are calculated at each pixel along this vertical line T-T', in both directions above and below the point, $P_i$.

Figure 4:
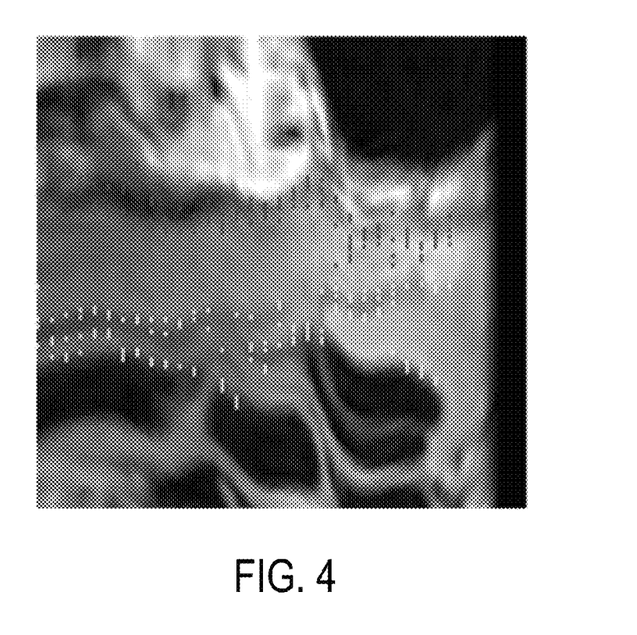
FIG. 4 is an example of an image depicting multiple different estimated upper and lower boundary points for a nerve contour.

The examination pixel is considered as the nerve's upper border pixel if a set of conditions is met, where those conditions are based on the weighting factor, $\omega$, and diffusion coefficient, $\gamma$, calculated at, above, and below the pixel. For example, the pixel can generally be considered as belonging to the nerve's upper border when the weighting factor at and around the pixel is greater than the diffusion coefficient at or above the pixel. Likewise, the examination pixel can be considered as belonging to the nerve's lower border pixel if a similar set of conditions is met. For instance, the examination pixel can generally be considered as belonging to the nerve's lower border when the weighting factor at or around the pixel is greater than the diffusion coefficient at or below the pixel. On each TT' line more the one control point can be found in both directions, as illustrated in FIG. 4.

To avoid unnecessary computing and to ensure early convergence of the algorithm, the following constrain could be used. The candidate points for the nerve's border above and below the point $P_i$, are searched in an interval [−3d/2, 3d/2] from the point $P_i$. Referring again to FIG. 3, this interval is illustrated as being delimited by lines U-U' and D-D', both of which are parallel to the nerve axis O-O'. The distance, d, can be determined empirically and can be selected to correspond to the half of the diameter, D, for specific types of nerves in the human body (i.e., d can be selected as D/2).

Next step of the segmentation is fitting a curve through boundary points acquired from the segmentation process using cubic spline interpolation i.e. piecewise-polynomial approximation on an interval $[x_0, x_n]$. This step uses cubic polynomials between each successive pair of nodes. Cubic polynomial consists of four constant coefficients and so there is sufficient flexibility in a cubic spline procedure to ensure that the interpolation is not only continuously differentiable on the interval, but also has a continuous second derivative. These coefficients bend the line just enough so that it passes through each of the data points without generating unwanted wild oscillations or breaks in continuity. The basic idea behind using a cubic spline is to fit a piecewise function of the form:

$$S(x) = \begin{cases} S_1(x), & x \in [x_1, x_2] \\ S_2(x), & x \in [x_2, x_3] \\ S_{n-1}(x), & x \in [x_{n-1}, x_n] \end{cases} ; \qquad (26)$$

where $S_i(x)$ is a third degree polynomial with coefficients $a_i$, $b_i$, $c_i$ and $d_i$ defined by, $$S_i(x) = a_i + b_i(x - x_i) + c_i(x - x_i)^2 + d_i(x - x_i)^3, \ i=1,2,\ldots,n-1 \qquad (27).$$

Given a function f(x) defined on an interval [a,b], and a set of nodes $a=x_0<x_1<\ldots<x_n=b$, a cubic spline interpolant S(x) for f(x) is a function that satisfies the following conditions:
 a) S(x) is a cubic polynomial, denoted by $S_i(x)$, on the subinterval $[x_i, x_{i+1}]$ for each $i=0, 1, \ldots, n-1$.
 b) $S_i(x)=f(x_i)$ and $S_i(x_{i+1})=f(x_{i+1})$ for each $i=0, 1, \ldots, n-1$.
 c) $S_{i+1}(x_{i+1})=S_i(x_{i+1})$ for each $i=0, 1, \ldots, n-2$
 d) $S'_{i+1}(x_{i+1})=S'_i(x_{i+1})$ for each $i=0, 1, \ldots, n-2$
 e) $S''_{i+1}(x_{i+1})=S''_i(x_{i+1})$ for each $i=0, 1, \ldots, n-2$
 f) And one of the following set of boundary conditions is also satisfied:

$$S''(x_0)=S''(x_n)=0$$

$$S'(x_0)=f'(x_0) \text{ and } S'(x_n)=f'(x_n)$$

To construct the cubic spline polynomial for a given function f(x), the conditions (a)-(f) given above are simply applied to the cubic polynomials, $S_i(x)$. The terms, $x_{i+1}-x_i$, are used repeatedly in this derivation, it is therefore convenient to define $h_i=x_{i+1}-x_i$ for each $i=0, 1, \ldots, n-1$. If $a_n=f(x_n)$ is also defined, then the following equitation can be provided, $$a_{i+1}=a_i+b_ih_i+c_ih_i^2+d_ih_i^3 \text{ for each } i=0,1,\ldots,n-1. \quad (28).$$

In a similar way, $$b_n=S'(x_n) \text{ and}$$

$$S'_i(x)=b_i+2c_i(x-x_i)+3d_i(x-x_i)^2 \quad (29);$$

implies that $S'(x_n)=b_n$ for each $i=0, 1, \ldots, n-1$. Applying condition (d) from above gives, $$b_{i+1}=b_i+2c_ih_i+3d_ih_i^2 \text{ for each } i=0,1,\ldots,n-1 \quad (30).$$

Observing $S''(x_n)=2c_n$ and applying condition (e) gives for each $i=0, 1, \ldots, n-1$, $$c_{i+1}=c_i+3d_ih_i \quad (31).$$

Solving for $d_i$ and substituting the aforementioned values into Eqns. (28) and (30) for each $i=0, 1, \ldots, n-1$ gives the following linear system of equations:

$$h_{i-1}c_{i-1} + 2(h_{i-1} + h_i)c_i + h_ic_{i+1} = \frac{3}{h_i}(a_{i+1} + a_i) - \frac{3}{h_{i-1}}(a_i - a_{i-1}); \quad (32)$$

for each $i=1, 2, \ldots, n-1$.

This system involves only the $\{c_i\}_{i=0}^n$ as unknowns since the values of the values of $\{h_i\}_{i=0}^{n-1}$ and $\{a_i\}_{i=0}^n$ are given, respectively, by the spacing of the nodes $\{x_i\}_{i=0}^n$ and the values of f(x) at the nodes. Once the values of $\{c_i\}_{i=0}^n$ are determined, it is a simple matter to find the remainder of the constants $\{b_i\}_{i=0}^{n-1}$ and $\{d_i\}_{i=0}^{n-1}$ from the relationships derived above and then construct the cubic polynomials $\{S_i(x)\}_{i=0}^{n-1}$.

Computing a cubic spline from the border data points represented by the vectors x and y will give coefficients of the cubic spline $a_i$, $b_i$, $c_i$ and $d_i$. A final border spline is calculated based upon the knots, which are given as x vectors. The number of knots used to construct the piecewise polynomial is a significant factor in suppressing the noise present in the border data, x and y.

For each x knot vector, an interpolated y knot vector can be calculated, which results in a set of points that defines the border fitted spline. This procedure is applied separately on the upper and lower border data points, to generate upper and lower mask splines.

These contours can then be manipulated to most closely represent the anatomical contour of the nerve. Once this adjustment has been made, the volume is generated and a surface rendered view can be displayed.

Figure 5:
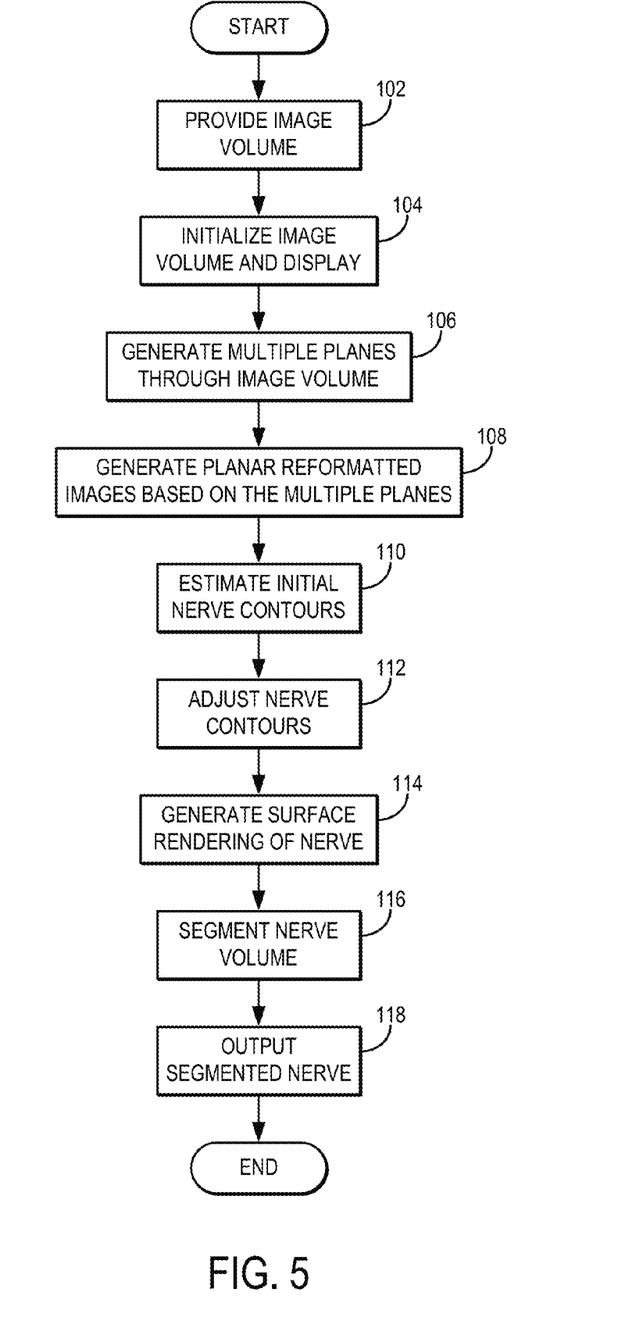
FIG. 5 is a flowchart setting forth the steps of an example of a method for segmenting a nerve from a three-dimensional image volume based on a plurality of planar reformatted images viewed through the image volume.

Referring to FIG. 5, a flowchart setting forth the steps of an example of a method for segmenting a nerve from a three-dimensional image volume obtained with an MRI system is illustrated. The method begins by providing a three-dimensional image volume that depicts at least one nerve and anatomical structures surrounding the at least one nerve, as indicated at step 102. By way of example, such an image volume may contain a plurality of contiguous two-dimensional images that depict the nerve and surrounding anatomical structures. At least some of the two-dimensional images are preferably oriented in a plane that is transverse or substantially transverse to the nerve.

Figure 6:
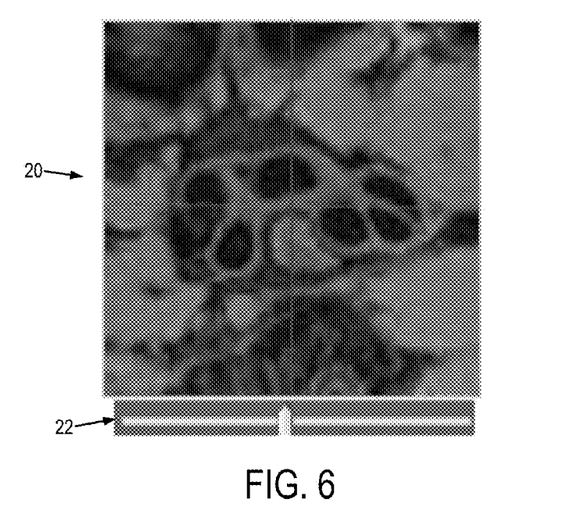
FIG. 6 is an example display of a cross-sectional image from an image volume depicting a nerve.

The image volume and a display can then be initialized for processing, as indicated at step 104. For instance, a first cross-sectional image can be selected from the image volume and displayed to the user. An example of this is illustrated in FIG. 6, where a cross-sectional image 20 from the image volume is displayed to the user. Optionally, a scroll bar 22 or other tool can be presented to allow the user to view different cross-sectional images in the image volume.

In some embodiments, initializing the image volume may include receiving a user-selected point associated with a nerve depicted in the image volume. For example, after a cross-sectional image is displayed to the user, the user can select a point in the image that is associated with a nerve to be segmented. As will be described below in more detail, initial nerve contours can be based at least in part on such a user-selected point. In other embodiments, a point from which initial nerve contours will be based upon can be automatically selected.

Multiple different planes that intersect the user-selected or automatically selected point are then generated, or otherwise defined, as indicated at step 106. These planes define portions of the image volume that will be used to generate planar reformatted images, as will be described below.

Figure 7:
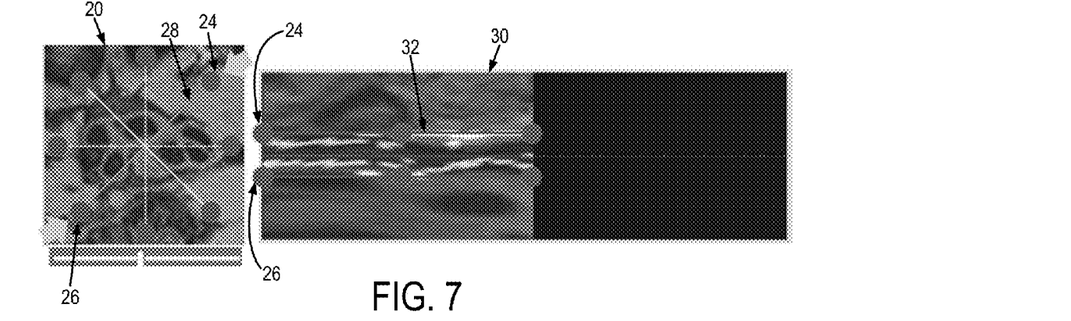
FIG. 7 is an example display of a cross-sectional image indicating a plurality of planes taken through the image volume and an associated planar reformatted image, in which nerve contour estimates are indicated.

As shown in FIG. 7, each plane can be defined by two control points 24, 26 that span a line segment 28 in a cross-sectional image 20. In some embodiments, the control points 24, 26 are equidistantly spaced from the user-selected or automatically selected point. In some other embodiments, the control points 24, 26 can be non-equidistantly spaced apart. As one example, the control points 24, 26 can be spaced apart by a distance that is based on characteristics of the image that are associated with nerve anatomy. For instance, the locations of the control points 24, 26 for a given plane may be automatically determined based on changes in the image intensity along the line segment that defines the plane, where the changes in image intensity are attributable with expected image intensity changes associated with nerve anatomy.

For each plane defined or otherwise generated, a planar reformatted ("PR") image is generated, as indicated at step 108. In general, these PR images can be viewed as oblique slices through the image volume as defined by the associated plane through the image volume. As shown in FIG. 7, the display of the cross-sectional image 20 is supplemented with a display of a selected PR image 30. The user is able to select different planes in the cross-sectional view, which will change the PR image 30 being displayed.

Based on the control points defined for each plane, initial nerve contours are estimated, as indicated at step 110, and as described above. As another example, each nerve contour can be approximated as a straight line extending through a particular plane from a point in the first cross section to a point in the last cross section of the image volume. A midpoint can also be defined along each nerve contour. An example of such an initial nerve contour 32 is illustrated in FIG. 7.

The initial nerve contours are next adjusted, or otherwise confirmed as accurate, as indicated at step 112. In general, this process includes selecting a PR image in which to adjust, or confirm for accuracy, the nerve contours. When a PR image is selected, it is displayed along side a cross-section view, as described above and shown in FIG. 7. The cross-section view will indicate the planes associated with the different PR views and will indicate the currently selected PR image that is being edited. In the cross-section view, the nerve contours associated with a particular plane are displayed as endpoints on a line segment associated with that plane. The cross-section view can thus indicate whether a particular nerve contour has been edited or not by changing the display of the endpoints for a given plane. For example, the color of an endpoint can be changed to indicate that the nerve contour associated with that endpoint has been adjusted.

As shown in FIG. 7, the initial nerve contours can be selected as straight lines extending from a point in the first cross-section image to a point in the last cross-section image. Preferably, the initial nerve contour will also include a point in the central cross section or a cross section close to the center of the PR image. The measure step along the PR image is the interslice spacing. For example, the horizontal axis of the PR image indicate the slice associated with a cross-section image from the provided image volume.

To edit or otherwise adjust a particular nerve contour, or segmentation spline, the user is able to manipulate the position of the points defined on the selected nerve contour. For example, the position of a nerve contour point can be adjusted in response to a user command. Preferably, the motion of the nerve contour end points is restricted to vertical movement within a cross-sectional image section. In some embodiments, the motion of contour points that are not endpoints is allowed as vertical motion within a cross-sectional image section and as horizontal motion across cross-sectional image sections. In some other embodiments, motion of these contour points may be restricted to vertical motion within an image section.

Figure 8:
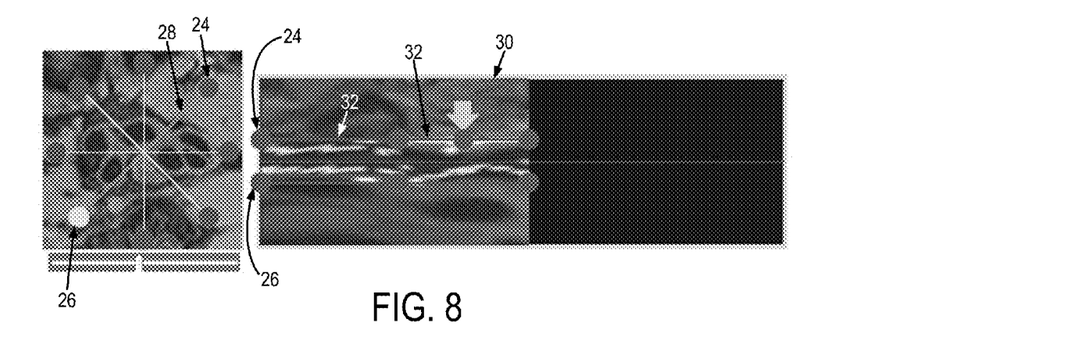
FIG. 8 is an example display of a cross-sectional image indicating a plurality of planes taken through the image volume and an associated planar reformatted image, in which nerve contour estimates are indicated and in which an additional point has been added to an edited nerve contour.

While editing or otherwise adjusting the points on a nerve contour, additional points can be added to the nerve contour in response to user selection, as illustrated in FIG. 8. For example, additional contour points can be added based on user input, such as in response to a mouse click or other input by the user indicating the location along the nerve contour at which the additional contour point should be added. Similarly, contour points can be deleted based on a user input. As one example, a contour point to be deleted can be selected with a mouse click or other user input and then deleted in response to a user key press or other input.

Figure 9A:
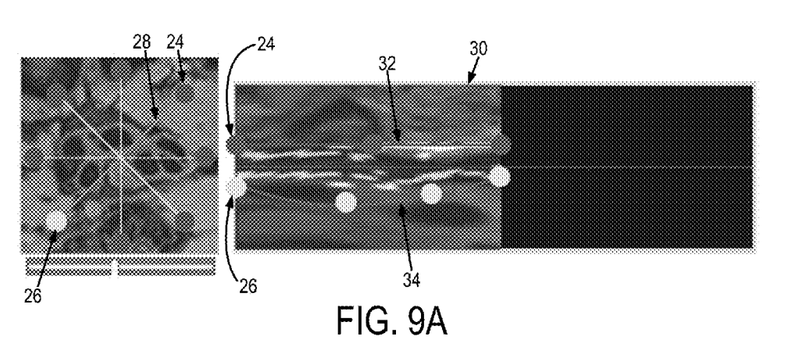
FIG. 9A is an example display of a cross-sectional image indicating a plurality of planes taken through the image volume and an associated planar reformatted image, in which an estimated nerve contour is indicated as having been adjusted.
Figure 9B:
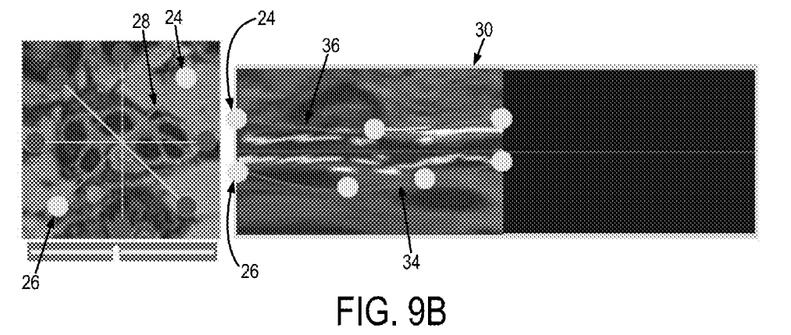
FIG. 9B is an example display of a cross-sectional image indicating a plurality of planes taken through the image volume and an associated planar reformatted image, in which both estimated nerve contours for a selected plane are indicated as having been adjusted.

Based on the adjustment of a contour point, the entire nerve contour is recalculated, as illustrated in FIGS. 9A and 9B. As illustrated in FIG. 8, the display can be configured to indicate when a contour point has been adjusted. For example, the color of a nerve contour point can be changed based on whether that point has been adjusted. As mentioned above, after a nerve contour has been adjusted, the display of the associated point in the cross section images can also be adjusted to indicate that the contour has been changed, as illustrated in FIGS. 9A and 9B, which show a first nerve contour 34 after being adjusted and both a first nerve contour 34 and a second nerve contour 36 after being adjusted, respectively.

After all the nerve contours have been adjusted, or otherwise confirmed as accurate, in each PR image, a surface rendering of the nerve is generated based on the adjusted nerve contours, as indicated at step 114. By way of example, the surface rendering of the nerve can be generated as follows.

Figure 10:
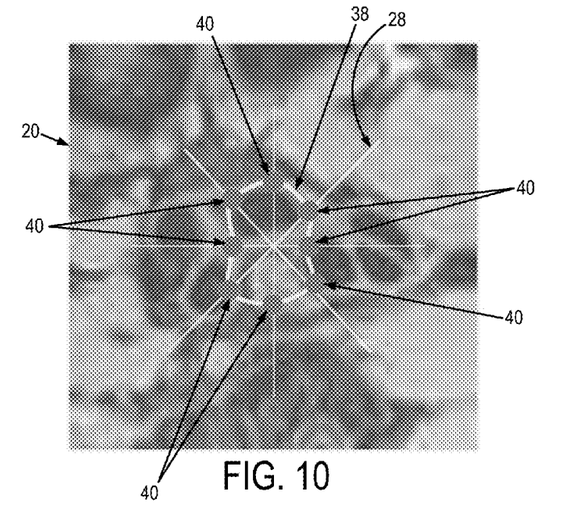
FIG. 10 is an example display of a cross-sectional image in which an in-slice spline is indicated, wherein the in-slice spline is computed based on the nerve contours intersecting with the cross-sectional image.

Starting from the first cross-sectional slice and up to the last cross-sectional slice, an in-slice spline is calculated based on the points in that cross section that are associated with the nerve contours. For instance, as illustrated in FIG. 10, an in-slice spline 38 can be calculated, with pixel spacing distance, based on the points 40 that are, each of them, the intersection of the current cross-section with the nerve contours.

Figure 11:
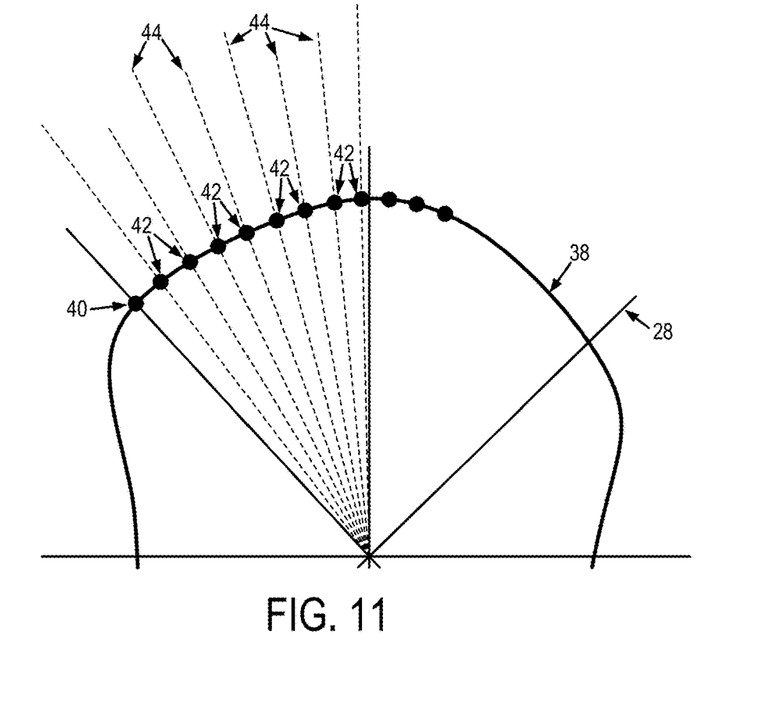
FIG. 11 is an example display of a surface rendering being computed based on an in-slice spline.
Figure 12:
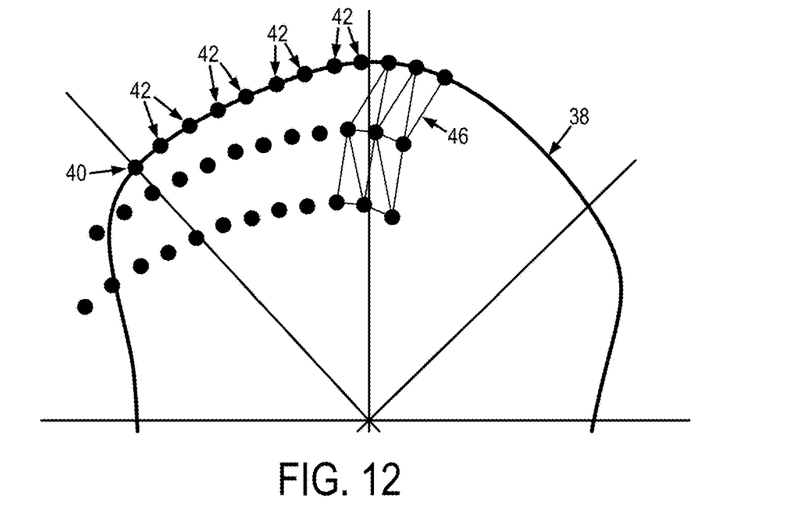
FIG. 12 is an example display of a surface rendering being computed using a mesh triangulation.

The surface rendering of the nerve can then be obtained based on these in-slice splines. For example, as illustrated in FIG. 11, the surface rendering can be obtained by defining points 42 on each in-slice spline 38, where each point 42 is defined by the intersection of the in-slice spline 38 with a vector 44 extending from the center of the in-slice spline 38. A plurality of such vectors 44 are defined using a number of predefined angle intervals. Based on the points 42 and the in-slice spline 38, a mesh triangulation 46 can then be calculated, as illustrated in FIG. 12.

Referring again to FIG. 5, the surface rendering is then utilized to compute and segment the nerve volume from the image volume, as indicated at step 116. The generated nerve volume can then be outputted, as indicated at step 118. By way of example, the nerve volume can be output as a volumetric mask that is stored in a memory or data storage, or the nerve volume can be output to a display for viewing by the user.

Advantageously, when the nerve volume has been created, the surrounding anatomy depicted in the image volume can be superimposed or selectively removed from a display to show the nerve in relation to the surrounding overlying anatomy, or alone, in varying degrees. This display has the benefit of allowing a clinician to view the nerve in its relation to the surrounding anatomy to better identify problematic regions that may cause impingement of the nerve. As such, the method of the present invention can provide unique information about the nerve and its surrounding anatomy that can improve surgical planning and guidance, as well as other treatment and diagnostic procedures. For instance, the segmented nerve volume computed in accordance with the present invention can be provided to improve the accuracy of an image-guided surgery procedure, including those that implement an image-guided robotic surgery system. As another feature, the nerve volume can be overlaid on the image volume and colored to highlight the nerve.

In some embodiments, a display of both the nerve volume and a cross-sectional image from the image volume can be provided. A planar indication that is associated with the view of the cross-sectional image can be overlaid on the display of the nerve volume to facilitate associating cross-sectional images of the nerve with the nerve volume. This planar indication can be normal to the nerve, or can be oriented at an arbitrary angle relative to the nerve axis. A discussion of generating such arbitrary views is provided in co-pending U.S. Patent Application 2014/0328529, which is herein incorporated by reference in its entirety.

With the display of the nerve volume and associated cross-sectional images, the user is able to identify regions-of-interest in the nerve volume and then navigate the planar indication to a region-of-interest so a cross-section of that region can be simultaneously viewed with the nerve volume. In some embodiments, more than one planar indication can be provided for simultaneously displaying multiple different views through the nerve volume. This display can be advantageous for rapidly identifying stenotic regions in the nerve and then visualizing one or more cross-sectional views of that stenotic region.

In some embodiments, regions-of-interest, such as stenotic regions, can be highlighted. For example, if a region of the nerve volume has a diameter that is outside of a range of expected values, the voxels associated with this troubled region can be highlighted when displaying the nerve volume. Using this display, trouble regions of the nerve can be rapidly, and reliably identified and presented to the user.

At all times, snapshots of the displays can be taken and saved into an image library for that study, later to be used for an embedded report writer, or to be sent as stand alone for the patient of clinician.

Figure 13:
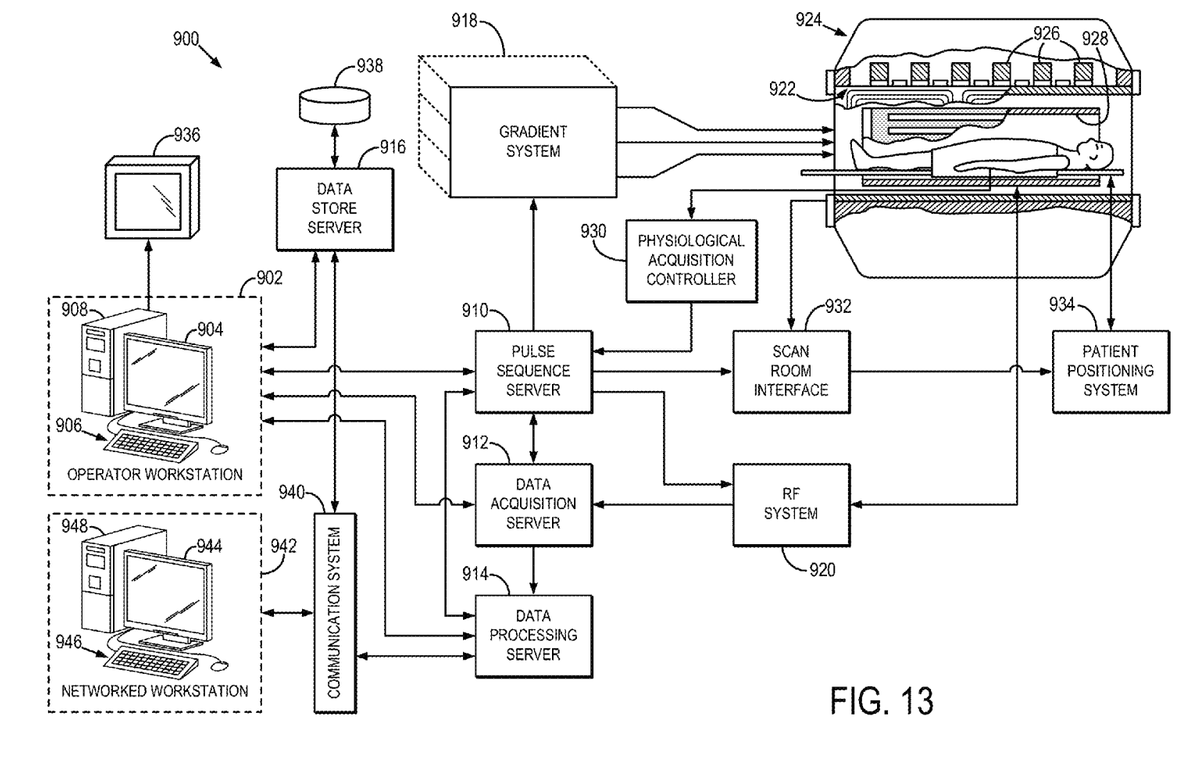
FIG. 13 is a block diagram of an example of a magnetic resonance imaging ("MRI") system.

Referring particularly now to FIG. 13, an example of a magnetic resonance imaging ("MRI") system 900 is illustrated. The MRI system 900 includes an operator workstation 902, which will typically include a display 904; one or more input devices 906, such as a keyboard and mouse; and a processor 908. The processor 908 may include a commercially available programmable machine running a commercially available operating system. The operator workstation 902 provides the operator interface that enables scan prescriptions to be entered into the MRI system 900. In general, the operator workstation 902 may be coupled to four servers: a pulse sequence server 910; a data acquisition server 912; a data processing server 914; and a data store server 916. The operator workstation 902 and each server 910, 912, 914, and 916 are connected to communicate with each other. For example, the servers 910, 912, 914, and 916 may be connected via a communication system 940, which may include any suitable network connection, whether wired, wireless, or a combination of both. As an example, the communication system 940 may include both proprietary or dedicated networks, as well as open networks, such as the internet.

The pulse sequence server 910 functions in response to instructions downloaded from the operator workstation 902 to operate a gradient system 918 and a radiofrequency ("RF") system 920. Gradient waveforms necessary to perform the prescribed scan are produced and applied to the gradient system 918, which excites gradient coils in an assembly 922 to produce the magnetic field gradients $G_x$, $G_y$, and $G_z$ used for position encoding magnetic resonance signals. The gradient coil assembly 922 forms part of a magnet assembly 924 that includes a polarizing magnet 926 and a whole-body RF coil 928.

RF waveforms are applied by the RF system 920 to the RF coil 928, or a separate local coil (not shown in FIG. 13), in order to perform the prescribed magnetic resonance pulse sequence. Responsive magnetic resonance signals detected by the RF coil 928, or a separate local coil (not shown in FIG. 13), are received by the RF system 920, where they are amplified, demodulated, filtered, and digitized under direction of commands produced by the pulse sequence server 910. The RF system 920 includes an RF transmitter for producing a wide variety of RF pulses used in MRI pulse sequences. The RF transmitter is responsive to the scan prescription and direction from the pulse sequence server 910 to produce RF pulses of the desired frequency, phase, and pulse amplitude waveform. The generated RF pulses may be applied to the whole-body RF coil 928 or to one or more local coils or coil arrays (not shown in FIG. 13).

The RF system 920 also includes one or more RF receiver channels. Each RF receiver channel includes an RF preamplifier that amplifies the magnetic resonance signal received by the coil 928 to which it is connected, and a detector that detects and digitizes the I and Q quadrature components of the received magnetic resonance signal. The magnitude of the received magnetic resonance signal may, therefore, be determined at any sampled point by the square root of the sum of the squares of the I and Q components:

$$M=\sqrt{I^2+Q^2} \qquad (33);$$

and the phase of the received magnetic resonance signal may also be determined according to the following relationship:

$$\varphi = \tan^{-1}\left(\frac{Q}{I}\right). \qquad (34)$$

The pulse sequence server 910 also optionally receives patient data from a physiological acquisition controller 930. By way of example, the physiological acquisition controller 930 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 910 to synchronize, or "gate," the performance of the scan with the subject's heart beat or respiration.

The pulse sequence server 910 also connects to a scan room interface circuit 932 that receives signals from various sensors associated with the condition of the patient and the magnet system. It is also through the scan room interface circuit 932 that a patient positioning system 934 receives commands to move the patient to desired positions during the scan.

The digitized magnetic resonance signal samples produced by the RF system 920 are received by the data acquisition server 912. The data acquisition server 912 operates in response to instructions downloaded from the operator workstation 902 to receive the real-time magnetic resonance data and provide buffer storage, such that no data is lost by data overrun. In some scans, the data acquisition server 912 does little more than pass the acquired magnetic resonance data to the data processor server 914. However, in scans that require information derived from acquired magnetic resonance data to control the further performance of the scan, the data acquisition server 912 is programmed to produce such information and convey it to the pulse sequence server 910. For example, during prescans, magnetic resonance data is acquired and used to calibrate the pulse sequence performed by the pulse sequence server 910. As another example, navigator signals may be acquired and used to adjust the operating parameters of the RF system 920 or the gradient system 918, or to control the view order in which k-space is sampled. In still another example, the data acquisition server 912 may also be employed to process magnetic resonance signals used to detect the arrival of a contrast agent in a magnetic resonance angiography ("MRA") scan. By way of example, the data acquisition server 912 acquires magnetic resonance data and processes it in real-time to produce information that is used to control the scan.

The data processing server 914 receives magnetic resonance data from the data acquisition server 912 and processes it in accordance with instructions downloaded from the operator workstation 902. Such processing may, for example, include one or more of the following: reconstructing two-dimensional or three-dimensional images by performing a Fourier transformation of raw k-space data; performing other image reconstruction algorithms, such as iterative or backprojection reconstruction algorithms; applying filters to raw k-space data or to reconstructed images; generating functional magnetic resonance images; calculating motion or flow images; and so on.

Images reconstructed by the data processing server 914 are conveyed back to the operator workstation 902 where they are stored. Real-time images are stored in a data base memory cache (not shown in FIG. 13), from which they may be output to operator display 912 or a display 936 that is located near the magnet assembly 924 for use by attending physicians. Batch mode images or selected real time images are stored in a host database on disc storage 938. When such images have been reconstructed and transferred to storage, the data processing server 914 notifies the data store server 916 on the operator workstation 902. The operator workstation 902 may be used by an operator to archive the images, produce films, or send the images via a network to other facilities.

The MRI system 900 may also include one or more networked workstations 942. By way of example, a networked workstation 942 may include a display 944; one or more input devices 946, such as a keyboard and mouse; and a processor 948. The networked workstation 942 may be located within the same facility as the operator workstation 902, or in a different facility, such as a different healthcare institution or clinic.

The networked workstation 942, whether within the same facility or in a different facility as the operator workstation 902, may gain remote access to the data processing server 914 or data store server 916 via the communication system 940. Accordingly, multiple networked workstations 942 may have access to the data processing server 914 and the data store server 916. In this manner, magnetic resonance data, reconstructed images, or other data may be exchanged between the data processing server 914 or the data store server 916 and the networked workstations 942, such that the data or images may be remotely processed by a networked workstation 942. This data may be exchanged in any suitable format, such as in accordance with the transmission control protocol ("TCP"), the internet protocol ("IP"), or other known or suitable protocols.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for segmenting a nerve in a three-dimensional image volume obtained with a magnetic resonance imaging (MRI) system, the steps of the method comprising:
    (a) providing a three-dimensional image volume that depicts a nerve and surrounding anatomical structures in a series of contiguous image slices obtained with an MRI system;
    (b) selecting a cross-sectional image from the image volume;
    (c) generating a plurality of planes that intersect at a common point in the selected cross-sectional image and are orthogonal to the selected cross-sectional image;
    (d) generating a planar reformatted image for each of the plurality of planes;
    (e) estimating nerve contours in each of the planar reformatted images;
    (f) receiving user feedback to adjust the estimated nerve contours;
    (g) generating a surface estimate based on the adjusted nerve contours; and
    (h) generating a volume that defines the nerve segmented from the surrounding anatomical structures based on the generated surface estimate.

2. The method as recited in claim 1, wherein step (f) includes receiving user feedback to adjust a position of a point in the estimated nerve contour and recalculating the estimate of the nerve contour based on the received user feedback.

3. The method as recited in claim 1, wherein step (f) includes adding at least one additional point to the estimated nerve contour based on the received user feedback.

4. The method as recited in claim 1, wherein step (c) includes selecting a number of desired planes.

5. The method as recited in claim 1, wherein step (g) includes generating an in-slice spline for each image slice based on an intersection of the estimated nerve contours with a given image slice.

6. The method as recited in claim 5, wherein step (g) includes generating the surface estimate as a surface rendering based on the in-slice splines for each image slice.

7. The method as recited in claim 6, wherein each surface rendering is generated based on intersection points defined by intersections of vectors extending from a center of the in-slice spline for a given image slice and the in-slice spline for that given image slice.

8. The method as recited in claim 7, wherein each surface rendering is generated as a mesh triangulation based on the intersection points.

* * * * *